United States Patent [19]
Macken et al.

[11] Patent Number: 5,206,763
[45] Date of Patent: * Apr. 27, 1993

[54] CORRECTIVE OPTICS FOR RECTANGULAR LASER BEAMS

[76] Inventors: John A. Macken, 3755 Wallace Rd., Santa Rosa, Calif. 95404; John A. Zuryk, 2144 Coffee La., Sebastopol, Calif. 95472

[*] Notice: The portion of the term of this patent subsequent to May 1, 2007 has been disclaimed.

[21] Appl. No.: 516,274

[22] Filed: Apr. 30, 1990

Related U.S. Application Data

[63] Continuation-in-part of Ser. No. 349,234, May 9, 1989, Pat. No. 4,921,338.

[51] Int. Cl.⁵ .......................... G02B 5/10; G02B 17/06
[52] U.S. Cl. .................................... 359/858; 359/861; 219/121.74
[58] Field of Search ....................... 350/504, 618, 619; 219/121.74; 359/857, 858, 861, 730

[56] References Cited

U.S. PATENT DOCUMENTS

| | | | |
|---|---|---|---|
| 3,224,330 | 12/1965 | Kompfner | 350/619 |
| 3,571,738 | 3/1971 | Gloge | 350/619 |
| 3,669,522 | 6/1972 | Anderson | 350/619 |
| 3,762,794 | 10/1973 | Arnaud | 350/619 |
| 4,586,795 | 5/1986 | Ono et al. | 350/619 |
| 4,588,269 | 5/1986 | Kessler | 350/619 |
| 4,921,338 | 5/1990 | Macken et al. | 350/619 |

Primary Examiner—Bruce Y. Arnold
Assistant Examiner—R. D. Shafer
Attorney, Agent, or Firm—Larry D. Johnson

[57] ABSTRACT

An optical apparatus is described which reshapes rectangular cross-section laser beams, with toroidal divergence to generally square cross-section beams with plane or spherical divergence. The apparatus uses either two spherical mirrors or two pairs of spherical mirrors.

4 Claims, 2 Drawing Sheets

CORRECTIVE OPTICS FOR RECTANGULAR LASER BEAMS

This application is a continuation-in-part of co-pending application Ser. No. 349,234, filed May 9, 1989, now U.S. Pat. No. 4,921,338.

BACKGROUND OF THE INVENTION

1. Field of the Invention

This invention relates to an optical apparatus for reshaping a generally rectangular cross-section beam of light to a generally square beam. This apparatus has particular application to lasers which have thin, flat ain mediums.

2. Description of the Prior Art

A new type of $CO_2$ laser (see U.S. Pat. 4,755,999 by the author herein) has a thin, flat amplification volume. This usually produces a rectangular output beam which exhibits two different divergence characteristics parallel and perpendicular to the wide dimension of the rectangular beam. For example, the laser beam typically exhibits greater divergence in the plane parallel to the narrow dimension of the beam compared to the plane parallel to the wide dimension of the beam. This beam exhibits a high degree of spatial coherence, but needs to be reshaped for most applications.

In the past, rectangular output beams have been corrected and reshaped using either cylindrical optics or prisms. Those skilled in the art know that cylindrical lenses or mirrors can introduce a convergence or divergence in one dimension without affecting the orthogonal dimension. Therefore, a rectangular beam with two different divergences can be corrected using cylindrical optics. It is also known that a prism can have the effect of changing the dimension and divergence of an optical beam in one plane, while leaving the other orthogonal plane unaffected. For example, a prism made out of germanium, with an index of refraction of 4 and with a 14 degree wedge angle, can be made to introduce a factor of 4 expansion or contraction in one plane, while leaving the orthogonal plane of the beam unaffected. This change in dimension of the laser beam is also accompanied by an increase or decrease in the divergence of the beam depending on whether the beam was expanded or contracted respectively. Prism correction often is not practical because material limitations and polarization problems limit the usefulness.

Both the cylindrical optics and the high index refraction prisms can be considerably more expensive than optics with spherical curvatures. Cylindrical optics often have to be combined in a multi-element optical system to produce the desired effect. This invention describes the use of spherical reflectors, used off axis, to reshape and collimate these rectangular laser beams.

SUMMARY OF THE INVENTION

A rectangular laser beam with a toroidal wavefront can be converted to a generally square beam with a spherical wavefront. In one embodiment, two spherical mirrors are used. The beam strikes the first mirror at an angle which forms two line foci in the reflected beam. A second spherical mirror is located at the point in space beyond the line foci where the beam has a square cross-section. Reflection off the second mirror corrects the divergence. The use of two pairs of spherical reflectors is also described.

DETAILED DESCRIPTION OF A PREFERRED EMBODIMENT

Figure 1:
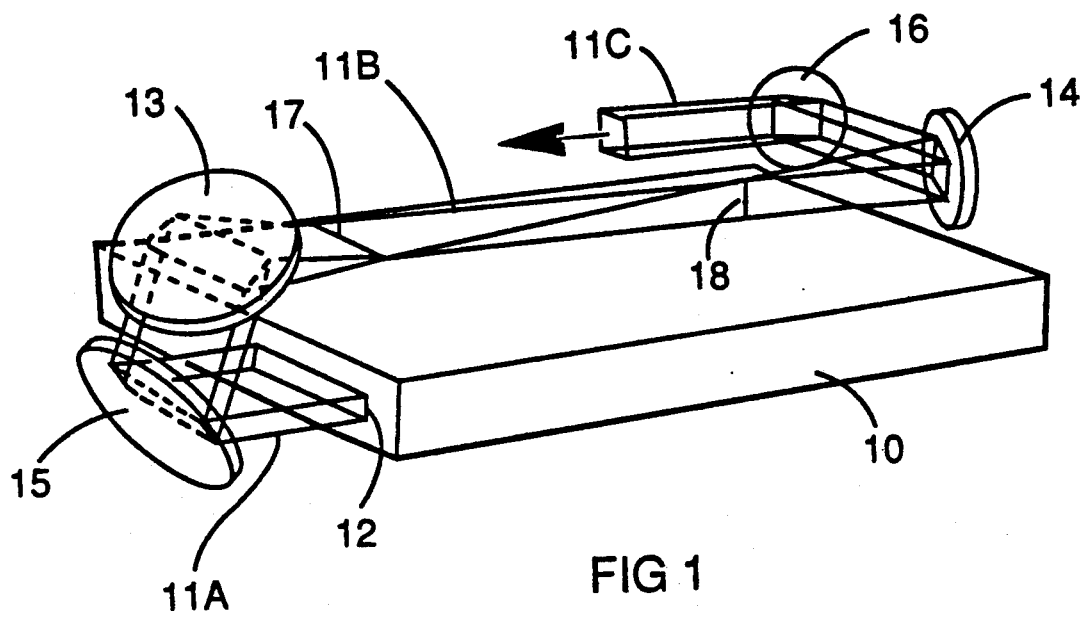
FIG. 1 is a perspective view of the preferred embodiment of the optical system.

FIG. 1 shows laser device 10 which has a gain medium (not shown) which is much thinner in one dimension than the two orthogonal dimensions. A laser beam emerges from laser device 10 through aperture 12. In the preferred embodiment, this beam initially strikes flat mirror 15 which reflects the beam up at a predetermined angle to strike spherical mirror 13 at a predetermined incident angle. Light reflecting from mirror 13 undergoes an intermediate form designated IIB. In this intermediate beam, two line foci are formed. Beyond these line foci, there is a point in space where the laser beam has the desired cross-sectional dimensions. A second mirror 14 is located at the point in space where the beam has the desired cross-section. The laser beam striking spherical mirror 14 receives wavefront correction. The beam then strikes optional flat mirror 16 and producing output beam 11C. Output beam 11C is depicted as being generally square in cross-section and generally parallel. While this is the preferred embodiment for the output beam, it will be discussed later that this does not represent the only condition for the output beam.

Figure 2:
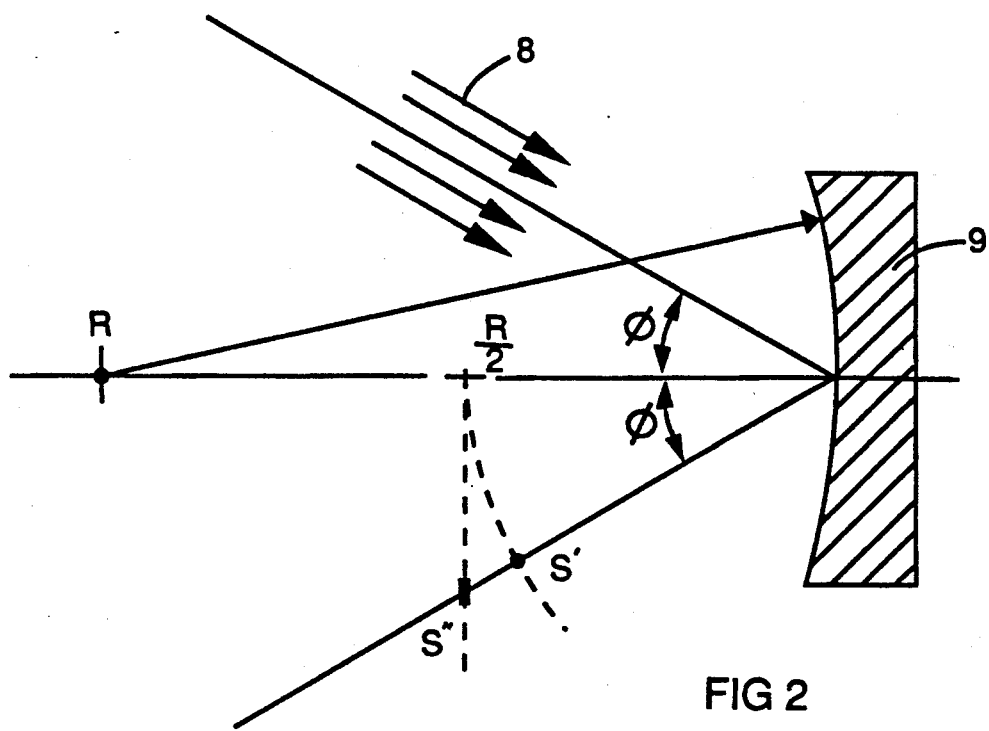
FIG. 2 is a perspective view of the essential components in the optical system.

To understand the principals involved here, FIG. 2 illustrates the effect of a parallel laser beam 8, striking spherical reflector 9. The spherical mirror has a radius of curvature R. The angles of incidence and reflection $\phi$ are measured from perpendicular to the surface. When the parallel beam strikes the spherical mirror off normal incidence, there are two foci formed. This is spherical astigmatism. One focus is a line oriented perpendicular to the plane of the paper at a distance S" from the mirror. The second focus is a line laying in the plane of the paper at a distance S'''. The formula for the location for these two foci is:

$$\frac{1}{S'} = \frac{-2}{R \cos \phi} \tag{1}$$

$$\frac{1}{S''} = \frac{-2 \cos \phi}{R} \tag{2}$$

When the light incident on the spherical mirror is not a plane wave, then the formulas become:

$$\frac{1}{S_1} + \frac{1}{S'} = \frac{-2}{R \cos \phi} \tag{3}$$

$$\frac{1}{S_2} + \frac{1}{S''} = \frac{-2 \cos \phi}{R} \tag{4}$$

Where $S_1$ is the distance from the mirror to the point of origin of the wave diverging in the plane of the paper. $S_2$ is the distance to the point of origin for a wave diverging perpendicular to the plane of the paper. The term "toroidal wavefront" will be used to designate an optical wave which has two different radii of curvature in orthogonal planes. Further explanation of $S_1$ and $S_2$ can be obtained later from FIG. 4 and the accompanying text.

Figure 3:
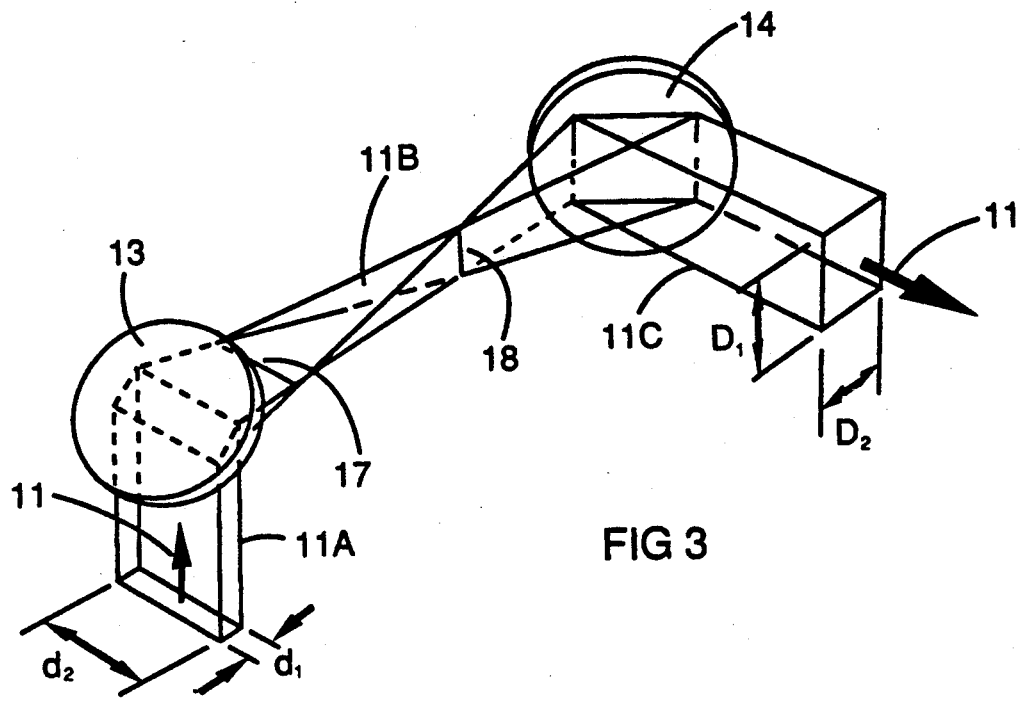
FIG. 3 is a diagram defining dimensions and distances.

The intention of this invention is to apply spherical astigmatism to change a rectangular laser beam with possible toroidal divergence into a useful condition, such as a parallel beam with a square cross-section. FIG. 3 starts with a rectangular cross-section laser beam IIA which strikes spherical mirror 13. Referring back to FIG. 1, mirror 13 and beam 11A are shown. FIG. 3 emphasizes the shape of the optical beam from a point shortly before it strikes mirror 13 to a point shortly after it has reflected off mirror 14. The laser beam 11A has a central ray 11 which shall be defined as located in the geometric center of beam 11A. The central ray 11 of beam 11A strikes mirror 13 at an angle, $\phi_1$. The angle $\phi_1$ is not designated in FIG. 3, but is analogous to angle $\phi$ in FIG. 2. The reflected beam now has two different convergence angles because of the off-axis incidence of the laser beam on the spherical mirror. The beam initially goes through a line focus shown as 17 in FIG. 3 (equivalent to S" in FIG. 2). The beam then goes through a second line focus 18 (equivalent to S'''). Line focus 18 is orthogonal to line focus 17. Laser beam 11B continues past these two foci and eventually reaches a cross-sectional dimension desired for the output beam. At the point where this cross-section size is reached, the beam strikes spherical mirror 14 at incidence angle $\phi_2$ for the central ray. The angle $\phi_2$ is not designated in FIG. 3, but is analogous to $\phi$ in FIG. 2. The spherical curvature of mirror 14 has been chosen such that the necessary corrections are introduced into the laser beam such that the laser beam, upon reflection, emerges with the desired wave front. In the preferred embodiment, this would be a plane wave front for beam 11C in FIG. 3. However, in the more general case, any spherical wave front may be chosen, as will be shown later. Therefore, FIG. 3 illustrates that the overall correction which has been performed started off with a rectangular laser beam of dimensions of $d_1$ and $d_2$ with two different divergence angles and ends up with the desired dimension $D_1$ and $D_2$ (in the preferred embodiment $D_1=D_2$) and with the desired spherical wave front. It is also possible to reverse this process so that a square (or round) beam becomes rectangular (or elliptical).

To accomplish these features, it is necessary for mirror 13 (FIG. 3) to be placed at a specific angle and orientation relative to the central ray 11 of laser beam 11A and, also, relative to external dimensions $d_1$ and $d_2$. Initially, it is necessary to define the plane of reflection for ray 11 off mirror 13. This imaginary plane, containing both the incident and reflected ray, is defined as being the plane perpendicular to dimension $d_2$ which also contains ray 11. Another way of expressing this is that in FIG. 1, mirror 13 is oriented such that immediately after refection, the wide dimension of laser beam 11B is parallel to the wide dimension of laser beam 11A. For example, in FIG. 1, the beam is shown to emerge with the wide dimension being horizontal. Upon reflection off mirror 13, the plane of reflection is such as to retain this initially horizontal orientation. If mirror 13 had been rotated slightly about a vertical axis, this would not only have steered the reflective beam, but also tilted the rectangular shaped beam which was reflected off the surface. This, in turn, would violate the previously stated preferred embodiment plane of reflection. While the most perfect correction occurs when this plane of refraction is observed, it should be understood that some deviation from the desired plane of reflection can be tolerated and still produce results which may be acceptable.

For mirror 14 to produce the necessary correction to the laser beam, central ray 11 must reflect off 14 such that the incident and reflected beam lie in a plane which is substantially perpendicular to the previously defined plane which contained the central ray reflecting off mirror 13. This is illustrated in FIG. 3. It would have been acceptable to tip mirror 14, such that beam 11C went in the opposite direction. This would have had beam 11C going left rather than right in FIG. 3.

Figure 4:
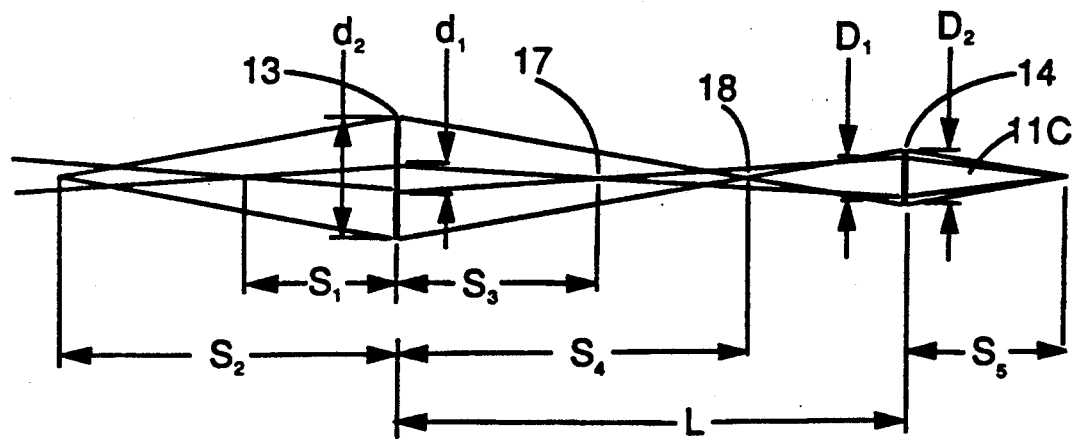

Turning now to FIG. 4, it is possible to make a diagram which defines the important dimensions. In this type of diagram, mirrors 13 and 14 will be depicted as if they were thin lenses which exhibit the same double focus property of the off-axis spherical reflector. This simplifies the drawing of the diagram. Also, a second feature is that the ray trace of the two orthogonal planes corresponding to the side and the narrow dimension of the laser beam will be rotated into the same plane so that it is possible to depict the ray path in each plane in a single diagram. Therefore, in FIG. 4, the toroidal rectangular beam with dimensions $d_1$ and $d_2$ can be thought of as consisting of a beam in one plane with dimension $d_2$ which is emitting from a line focus located a distance $S_2$ from mirror 13. Similarly, in the other plane, the beam of dimension $d_1$ appears to be emitting from a line focus located a distance $S_1$ from mirror 13. Upon reflection off mirror 13 (depicted as a transmission with optical power), this toroidal rectangular beam has two different curvatures introduced in the laser beam because of the off-axis reflection angle used. In the plane containing dimension $d_1$, the laser beam comes to a line focus at distance $S_3$, while, in the plane containing $d_2$, the laser beam comes to a line focus at a distance $S_4$. These line foci were previously defined in FIG. 3 as being located at 17 and 18 respectively. The beam then is allowed to continue to expand until it reaches the desired dimension $D_1$ and $D_2$. In the preferred embodiment, $D_1=D_2$ and the beam, at this point in space, is a square cross-section beam. At this point, the light reflects off mirror 14 at a predetermined angle, $\phi_2$, producing a single spherical wave front which can be defined as if it comes to a focus at distance $S_5$ from mirror 14. In the preferred embodiment, this would be a plane wave front and $S_5$ would be located at infinity. The known properties are presumed to be beam dimensions $d_1$ and $d_2$, as well as toroidal curvatures $S_1$ and $S_2$. The distance L between mirrors 13 and 14 can also be fixed. It is also possible to define the output beam characteristic desired, namely, the spherical curvature $S_5$ desired, as well as the dimensions $D_1$ and $D_2$ of the output beam. Given these properties, it is possible to solve for the radius for mirror 13 and 14 and the incidence, angle $\phi_1$ and $\phi_2$ using the following equations:

$$\cos \phi_1 = \left( \frac{\frac{1}{S_2} + \frac{D_2 + d_2}{d_2 L}}{\frac{1}{S_1} + \frac{D_1 + d_1}{d_1 L}} \right)^{\frac{1}{2}} \quad (5)$$

$$\cos \phi_2 = \left( \frac{\frac{1}{S_5} + \frac{D_1 + d_1}{D_1 L}}{\frac{1}{S_5} + \frac{D_2 + d_2}{D_2 L}} \right)^{\frac{1}{2}} \quad (6)$$

$$R_1 = \frac{2 \cos \phi_1}{\frac{1}{S_2} + \frac{D_2 + d_2}{d_2 L}} \quad (7)$$

$$R_2 = \frac{2 \cos \phi_2}{\frac{1}{S_5} + \frac{D_1 + d_1}{D_1 L}} \quad (8)$$

The proper use of these formulas can be illustrated by the following example. A $CO_2$ laser produced a rectangular output beam with dimensions $d_1 = 1.27$ cm and $d_2 = 8.13$ cm. A measurement of the divergence of this output beam showed that the laser beam had a divergence of $S_1 = 250$ cm and $S_2 = 1346$ cm. Referring now to FIG. 1, it can be assumed that the laser beam 11A has the output characteristics just described. The length of laser 10 is such that the separation distance L between mirrors 13 and 14 is chosen to be 276.86 cm. Furthermore, the desired output beam has a nearly quare cross-section with $D_1 = 2.54$ cm and $D_2 = 2.57$. Furthermore, it is desired to have this output beam be plane wave. This is equivalent to setting $S_5$ at infinity. Substituting these conditions into the above formulas, mirror 13 is found to have a concave radius of 221.49 cm. The angle of incidence of the central ray on the mirror 13 is such athat $\phi_1 = 52.51°$. Mirror 14 is a concave also wtih a radius of 221.49 cm with the incidence angle, $\phi_2$ being 53.13°. In this example, mirrors 15 and 16 are flat mirrors. Mirror 15 is oriented to produce the desired incidence angle on mirror 13, while mirror 16 is oriented to direct the beam at a convenient angle away from the laser. Mirror 16 could, of course, be reversed to reflect 11C in the opposite direction. If there is any doubt about the orientation or frame of reference required in the above formulas, then this example should be used as a guide for clarification.

However, if it was necessary to shorten the length L to 100 cm while maintaining the same sizes for $d_1$, $d_2$, $D_1$ and $D_2$, this would result in a solution which was not diffraction limited for 10 micron light. Those skilled in the art know how to analyze the distortion introduced using standard ray tracing computer programs. If the analysis indicates that the additional corrections are required for a particular application, then the best way of introducing corrections is to make mirrors 15 and 16, shown in FIG. 1, concave mirrors. Therefore, mirrors 13, 14, 15 and 16 would all be concave. In this solution, mirrors 15 and 13 work together as a closely spaced pair to perform the function of forming line foci 17 and 18 which were previously accomplished by mirror 13 alone. The reason that the two mirrors greatly reduce the distortion is that the line focus 18 is actually tipped at an angle approximately equal to $\phi_1$ relative to the propagation direction of central beam 11 in FIG. 3. This typing is illustrated in FIG. 2 because S" is not perpendicular to 8, the central ray. This is not noticeable if the depth of focus at 18 is larger than the distance covered by the tipping of the line focus. However, if the extent of this tipped line focus in the propagating direction becomes larger than the depth of focus at 18 or 17 respectively, then the additional correction of using two pair of spherical mirrors will greatly reduce the distortion. An example of two mirror pairs, which is easy to explain, would be to have mirrors 13 and 15 in FIG. 1, each be concave with a radius approximately twice the radius given by equation 7. Also, each mirror would be held at angles, such that the central ray would have an incidence angle $\phi_1$ for each mirror. Finally, in the ideal case, the distance between the two mirrors 13 and 15 would be reduced as close to zero as possible. Also, the distance L would be measured from the mid-point between mirrors 13 and 15 to the mid-point between mirrors 14 and 16. In this case, the line focus 18 would be centered at the same point in space as previously, but the use of two pairs of mirrors makes the line foci perpendicular to the optical propagation direction.

It should be pointed out that combining two spherical reflectors only produces a decrease in aberrations when the two adjacent mirrors are oriented to produce an additive effect in changing the direction of the beam. For example, in FIG. 1, mirror 14 and 16 are shown to both bend the beam in a "U" shape. This is the correct orientation. If mirror 16 had been reversed to direct the beam in the opposite direction (creating a "Z" shape), then the corrective effect would have been lost. Similarly, mirrors 13 and 15 work together to add angles.

It is to be understood that the two pair of concave reflectors produces an optical path which has all the same characteristics as illustrated in FIGS. 3 and 4. In fact, two optical elements, such as concave mirrors, can be equivalent to a single concave mirror located at the point between the two concave mirrors when only the central ray is analyzed. The benefit of the pair of mirrors comes to correct path length differences for rays which are not the central ray. Those skilled in the art can calculate many combinations of two spherical mirrors used off-axis, which form line foci centered at points 17 and 18. The location of point 17, in FIG. 4, is at a distance $S_3$ given by the following formula:

$$S_3 = \frac{d_1 L}{d_1 + D_1} \quad (9)$$

Similarly, the distance to point 18 is $S_4$ and given by the following formula:

$$S_4 = \frac{d_2 L}{d_2 + D_2} \quad (10)$$

Where the terms in these formulas have been previously defined.

Mirror 13 in FIGS. 3 and 4 can be considered optical equivalent of a pair of mirrors consisting of concave mirrors 13 and 15, shown in FIG. 1. Similarly, mirror 14 in FIGS. 3 and can be equivalent to a pair of mirrors 14 and 16 in FIG. 1. Those skilled in the art know how to define the location of 13 and 14 in FIG. 4 when this optical equivalent pair of mirrors is used to replace a single mirror.

The application of this optical design has particular application to beams which need a high degree of nonuniform correction. In the preferred embodiment, at least one of the previously defined angles, $\phi_1$ or $\phi_2$, should exceed 25°. Also, as previously stated, all the examples have been given presuming rectangular beam being corrected to a square cross-section beam. However, it is to be understood that this applies equally well to the reverse transformation of a square beam to a rectangular beam. Similarly, transformations between elliptical and circular cross-sectional beams are included here.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An apparatus for changing the geometric cross section of a laser beam comprising:

first mirror with a generally spherical curvature of radius $R_1$ and a second mirror with a generally spherical curvature of radius $R_2$;

said laser beam can be defined to having an imaginary central ray;

said first and second mirror positioned and oriented such that a said central ray of said laser beam strikes said first mirror at an incidence angle $\phi_1$ producing a reflected beam which strikes said second mirror at angle $\phi_2$ and producing a reflected beam;

said central ray has a path length of L between said first mirror and said second mirror;

said laser beam immediately before it strikes said first reflector has transverse dimensions of $d_1$ and $d_2$ where $d_2$ is at least as larger than as $d_1$;

said laser beam immediately before it strikes said first reflector has a wavefront with radius of curvature $S_2$ in a first imaginary plane perpendicular to said dimension $d_1$;

said laser beam immediately before it strikes said first mirror has a wavefront of radius of curvature $S_1$ in a second imaginary plane perpendicular to said dimension $d_2$;

said first mirror is oriented such that said incident and reflected beam striking said first mirror generally lies in a said second imaginary plane;

said second mirror is oriented such that said incident and reflected beam striking said second mirror lies in a third imaginary plane which is generally perpendicular to said second imaginary plane;

said laser beam immediately after it has reflected off said second mirror has transverse dimensions $D_1$ and $D_2$, said dimension $D_1$ approximately equal to said dimension $D_2$;

said laser beam immediately after is has reflected off said second mirror has generally spherical wavefront of radius of curvature equal to $S_5$ where radius $S_5$ approximately equals infinity;

said first and second mirrors are positioned and configured to generally satisfy the following equations:

$$R_1 = \frac{2 \cos \phi_1}{\frac{1}{S_2} + \frac{D_2 + d_2}{d_2 L}}$$

$$R_2 = \frac{2 \cos \phi_2}{\frac{1}{S_5} + \frac{D_1 + d_1}{D_1}}$$

$$\cos \phi_1 = \left( \frac{\frac{1}{S_2} + \frac{D_2 + d_1}{d_2 L}}{\frac{1}{S_1} + \frac{D_1 + d_1}{d_1 L}} \right)^{\frac{1}{2}}$$

$$\cos \phi_2 = \left( \frac{\frac{1}{S_5} + \frac{D_1 + d_1}{D_1 L}}{\frac{1}{S_5} + \frac{D_2 + d_2}{D_2 L}} \right)^{\frac{1}{2}}$$

2. An apparatus for transforming the shape of a laser beam comprising:

said laser beam can be defined as having an imaginary central ray;

first optical means consisting of at least one spherical mirror reflecting said central ray of said laser beam at an incidence angle greater than 25 degrees; measured from normal incidence to said spherical mirror of said first optical means;

said first optical means converges said laser beam to form first line focus and second line focus;

said laser beam initially has transverse dimensions of $d_1$ and $d_2$ where $d_2$ is at least as large as $d_1$;

second optical means consisting of at least one spherical mirror which reflects said central ray of said laser beam at an incidence angle greater than 25 degrees;

said laser beam emerges from said second optical means with transverse dimensions $D_1$ and $D_2$;

said first optical means is separated from said second optical means by a distance L;

said first line focus is separated from said first optical means by a distance $S_3$ which is approximately given by the following equation:

$$S_3 = \frac{d_1 L}{d_1 + D_1}$$

said second line focus is separated from said first optical means by a distance $S_4$ which is approximately given by the following equation:

$$S_4 = \frac{d_2 L}{d_2 + D_2}$$

said second optical means acts on said laser beam to form an output beam which has an approximately spherical wave front curvature of radius $S_5$.

3. The apparatus described in claim 2 wherein the said second optical means consists of two mirrors, each with a concave spherical surface, said two mirrors being closely spaced relative to said distance L.

4. The apparatus described in claim 2 wherein said radius $S_5$ approximately equals infinity and further where said dimension $D_1$ approximately equals said dimension $D_2$.

* * * * *